US012573833B2

(12) United States Patent
Farrell et al.

(10) Patent No.: US 12,573,833 B2
(45) Date of Patent: Mar. 10, 2026

(54) ELECTRICAL SPLICE CONNECTOR FOR CONNECTING ELECTRICAL CABLES WITH CONDUCTOR PAIRS

(71) Applicant: Aptiv Technologies AG, Schaffhausen (CH)

(72) Inventors: Jack Farrell, Warren, OH (US); Justin Kopelos, Niles, OH (US); Samuel Bevilacqua, Volant, PA (US)

(73) Assignee: Aptiv Technologies AG, Schaffhausen (CH)

( * ) Notice: Subject to any disclaimer, the term of this patent is extended or adjusted under 35 U.S.C. 154(b) by 159 days.

(21) Appl. No.: 18/506,431

(22) Filed: Nov. 10, 2023

(65) Prior Publication Data

US 2025/0158380 A1     May 15, 2025

(51) Int. Cl.
    H02G 15/18     (2006.01)
    H01R 4/18     (2006.01)
    H02G 1/00     (2006.01)
(52) U.S. Cl.
    CPC ......... H02G 15/1806 (2013.01); H01R 4/183 (2013.01); H02G 1/005 (2013.01)
(58) Field of Classification Search
    CPC ... H01R 4/02; H01R 4/04; H01R 5/04; H01R 5/08; H02G 3/02; H02G 3/06; H02G 15/02; H02G 15/08
    USPC ......... 174/74 R–93; 439/189, 596, 656, 725, 439/790
    See application file for complete search history.

(56) References Cited

U.S. PATENT DOCUMENTS

| | | | | |
|---|---|---|---|---|
| 2,971,180 A | * | 2/1961 | Colwell ............... | H01R 13/115 |
| | | | | 439/367 |
| 3,317,658 A | * | 5/1967 | Smith .................... | H02G 15/18 |
| | | | | 174/92 |
| 3,441,658 A | * | 4/1969 | Smith .................... | H02G 15/10 |
| | | | | 174/77 R |
| 4,144,404 A | * | 3/1979 | De Groef ............... | H01R 4/723 |
| | | | | 333/260 |
| 4,778,948 A | * | 10/1988 | Fitch .................. | H02G 15/1806 |
| | | | | 174/DIG. 8 |

(Continued)

FOREIGN PATENT DOCUMENTS

| | | |
|---|---|---|
| CN | 109546458 B | 11/2023 |
| EP | 4052969 A1 | 9/2022 |
| FR | 3094144 A1 | 9/2020 |

OTHER PUBLICATIONS

"Extended European Search Report for Application No. 24196507. 8"; European Patent Office; Mailed on Feb. 18, 2025; 9 pages.

*Primary Examiner* — William H. Mayo, III
(74) *Attorney, Agent, or Firm* — Billion & Armitage

(57) ABSTRACT

An electrical splice connector may include a first splice terminal crimped to a first wire conductor of a first wire cable and crimped to a first wire conductor of a second wire cable. An electrical splice connector may include a second splice terminal crimped to a second wire conductor of the first wire cable and crimped to a second wire conductor of the second wire cable. An electrical splice connector include a dividing insulator formed of a dielectric material having a first cavity in which the first splice terminal is disposed and having a second cavity in which the second splice terminal is disposed. The second cavity is separated from the first cavity by a wall formed of the dielectric material.

19 Claims, 3 Drawing Sheets

(56)                    References Cited

U.S. PATENT DOCUMENTS 7,319,194 B2 *    1/2008  Bryla ..................... H02G 15/08
                                                      174/92
7,980,872 B1 *    7/2011  Smutny ............. H01R 13/4361
                                                      439/189
8,471,148 B2 *    6/2013  Steinich ................. H01R 4/021
                                                      174/74 A
11,527,839 B2    12/2022  Matcha et al.
2023/0178265 A1    6/2023  Schäfer et al.
2023/0318233 A1   10/2023  Karita et al.

* cited by examiner

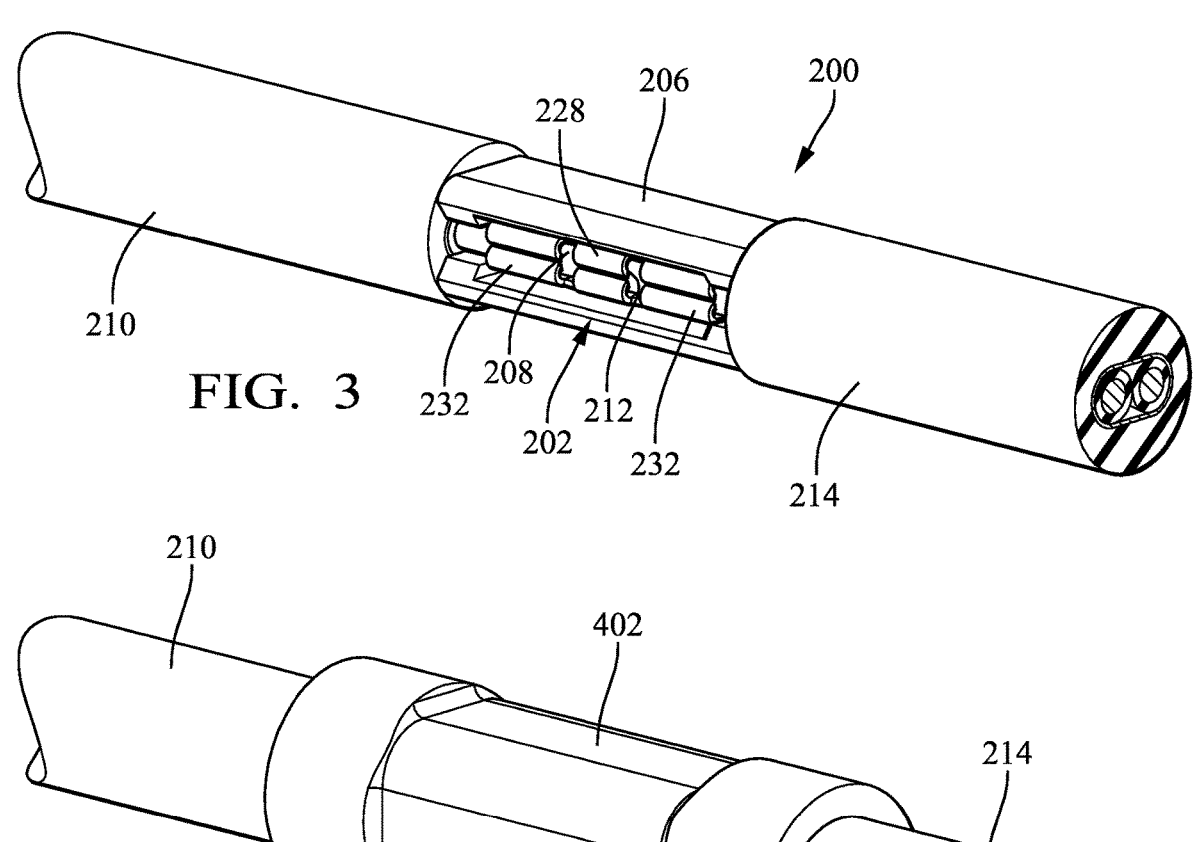
FIG. 3
FIG. 4
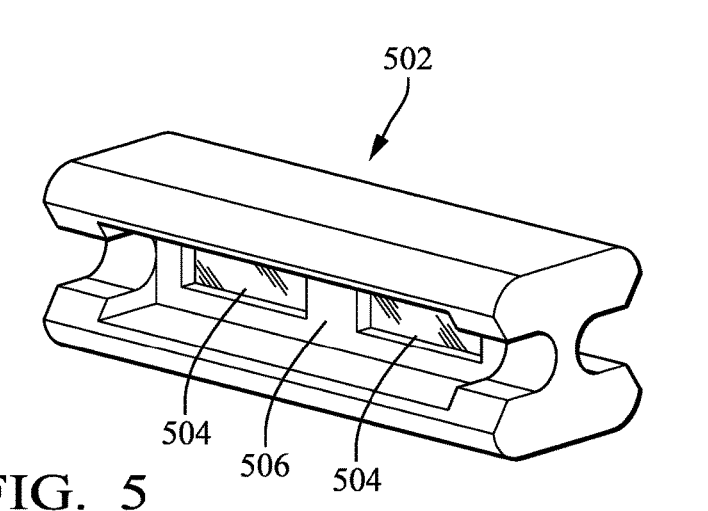
FIG. 5

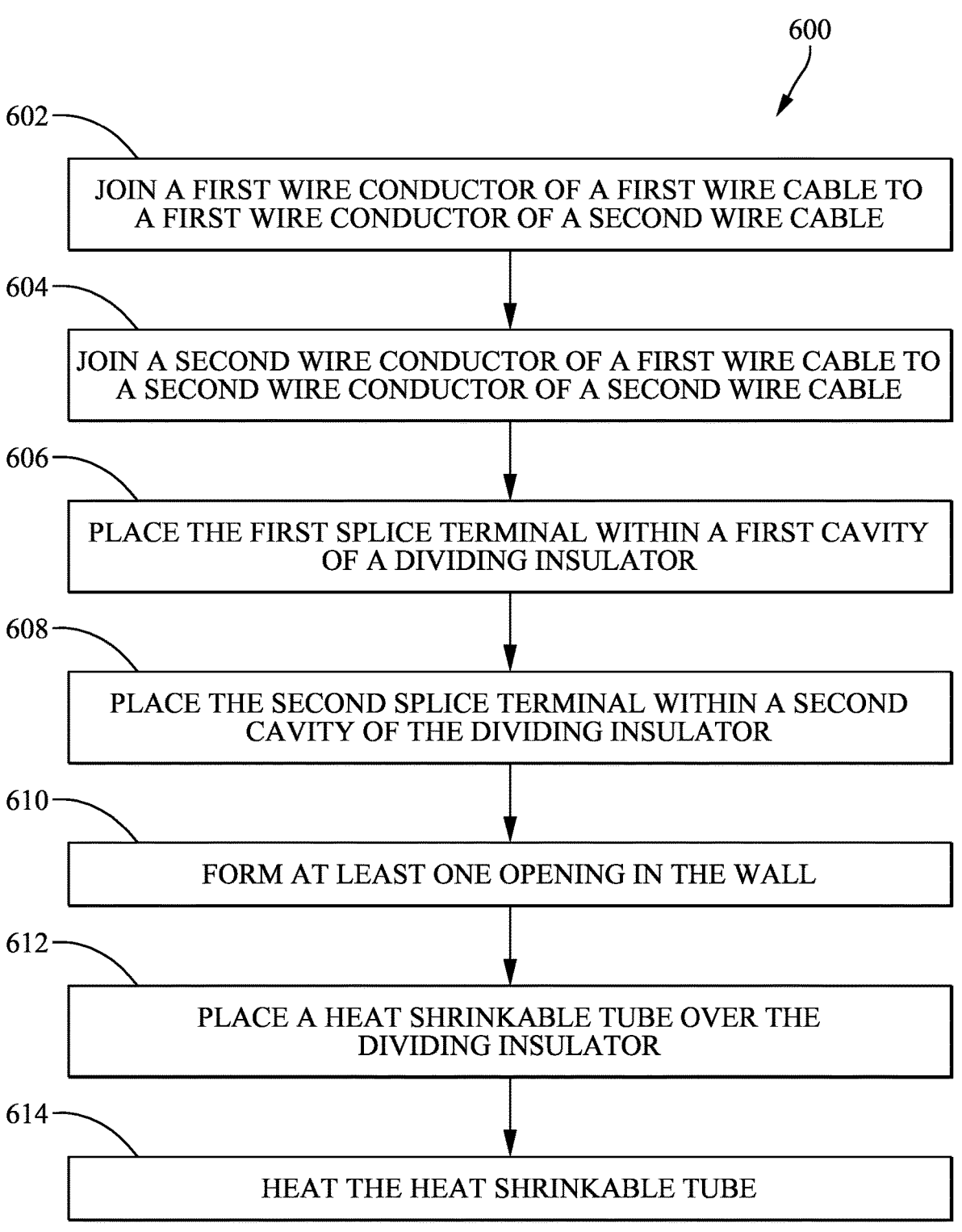

600

602 — JOIN A FIRST WIRE CONDUCTOR OF A FIRST WIRE CABLE TO A FIRST WIRE CONDUCTOR OF A SECOND WIRE CABLE

604 — JOIN A SECOND WIRE CONDUCTOR OF A FIRST WIRE CABLE TO A SECOND WIRE CONDUCTOR OF A SECOND WIRE CABLE

606 — PLACE THE FIRST SPLICE TERMINAL WITHIN A FIRST CAVITY OF A DIVIDING INSULATOR

608 — PLACE THE SECOND SPLICE TERMINAL WITHIN A SECOND CAVITY OF THE DIVIDING INSULATOR

610 — FORM AT LEAST ONE OPENING IN THE WALL

612 — PLACE A HEAT SHRINKABLE TUBE OVER THE DIVIDING INSULATOR

614 — HEAT THE HEAT SHRINKABLE TUBE

FIG. 6

ELECTRICAL SPLICE CONNECTOR FOR CONNECTING ELECTRICAL CABLES WITH CONDUCTOR PAIRS

TECHNICAL FIELD OF THE INVENTION

The disclosure generally relates to an electrical splice connector for connecting electrical cables with conductor pairs, such as unshielded twisted pair cables used for Ethernet communication.

BACKGROUND

There have been various means and methods used to splice electrical cables with conductor pairs, such as the unshielded twisted pair cable 100 shown in FIG. 1. A first method involves simply twisting each end of the conductor pair in one cable to their respective mates in another cable. A second method employs two insulation-displacement contact (IDC) spicing devices that cut through the cable insulation in order to create a physical and electrical contact with the conductor pair in one cable to their respective mates in the other cable. A third method uses a press fit connector in which the two conductor ends of each cable are pressed between two pieces of metal. The insulation of the cable is stripped back to expose the conductors within the cable to create a physical and electrical connection. In each of these splicing methods, the capacitive coupling between the contact pairs is not well controlled which may affect the impedance of the splice connection and the frequency response characteristics of the spliced electrical cable. None of these splicing methods are suitable for use in a harsh environment, such as the environment found an automobile or other ground, marine, or aerospace vehicles because they are not capable of meeting mechanical, electrical, and environmental requirements needed in these applications.

SUMMARY

In some aspects, the techniques described herein relate to an electrical splice connector which includes a first splice terminal crimped to a first wire conductor of a first wire cable and crimped to a first wire conductor of a second wire cable, a second splice terminal crimped to a second wire conductor of the first wire cable and crimped to a second wire conductor of the second wire cable, and a dividing insulator formed of a dielectric material having a first cavity in which the first splice terminal is disposed and having a second cavity in which the second splice terminal is disposed. The second cavity is separated from the first cavity by a wall formed of the dielectric material.

In some aspects, the techniques described herein relate to a method of splicing a first wire cable to a second wire cable, including the steps of joining a first wire conductor of a first wire cable to a first wire conductor of a second wire cable by crimping a first splice terminal to the first wire conductors, joining a second wire conductor of the first wire cable to a second wire conductor of the second wire cable by crimping a second splice terminal to the second wire conductors, placing the first splice terminal within a first cavity of a dividing insulator, and placing the second splice terminal within a second cavity of the dividing insulator which is separated from the first cavity by a wall.

In some aspects, the techniques described herein relate to an electrical splice connector for connecting a first wire cable having first and second wire conductors and a second wire cable having first and second wire conductors, the electrical splice connector includes a first splice terminal configured for being crimped to the first wire conductor of the first wire cable and for being crimped to the first wire conductor of the second wire cable, a second splice terminal configured for being crimped to the second wire conductor of the first wire cable and for being crimped to the second wire conductor of the second wire cable, and a dividing insulator formed of a dielectric material having a first cavity in which the first splice terminal is disposed and having a second cavity in which the second splice terminal is disposed. The second cavity is separated from the first cavity by a wall formed of the dielectric material.

BRIEF DESCRIPTION OF THE DRAWINGS

The present invention will now be described, by way of example with reference to the accompanying drawings, in which:

FIG. 3 is an isometric view of the electrical splice connector of FIG. 2 in accordance with some embodiments of the invention.

FIG. 4 is an isometric view of the electrical splice connector of FIG. 2 covered by heat shrink tubing in accordance with some embodiments of the invention.

FIG. 5 is an isometric view of a dividing insulator of an electrical splice connector in accordance with some embodiments of the invention.

FIG. 6 is a flow chart of a method for splicing a first wire cable to a second wire cable in accordance with some embodiments of the invention.

DETAILED DESCRIPTION

Figures 1, 2:
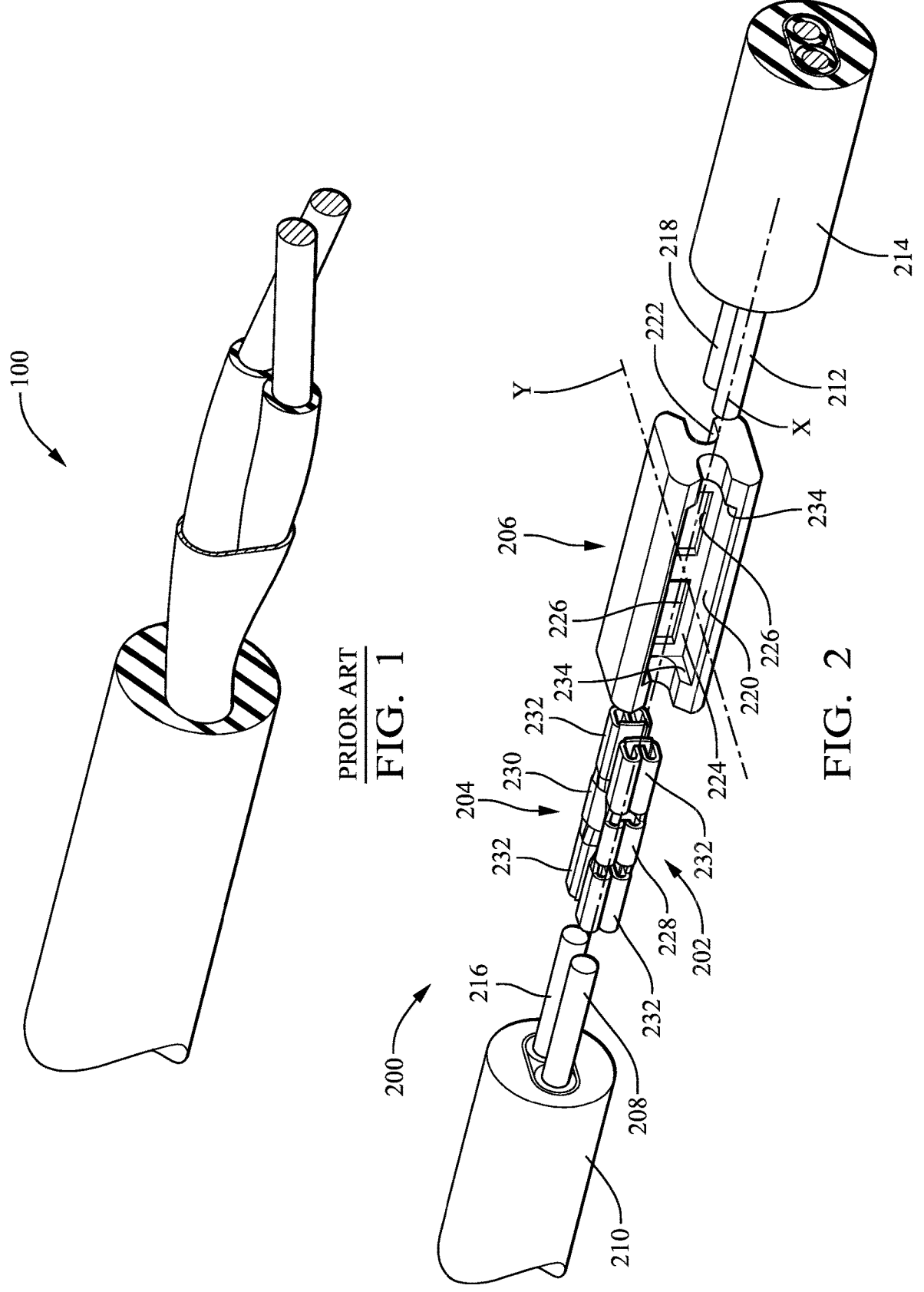
FIG. 1 is an isometric view of an electrical cable having a pair of electrical conductors in accordance with the prior art.
FIG. 2 is an exploded view of an electrical splice connector in accordance with some embodiments of the invention.

The electrical splice connector 200 shown in FIG. 2 consists of four main components: two metal splice terminals 202, 204, and a dividing insulator 206. As shown in FIG. 3, the first splice terminal is crimped to a first wire conductor 208 of a first wire cable 210 and is crimped to a first wire conductor 212 of a second wire cable 214. The second splice terminal 204 is crimped to a second wire conductor 216 of the first wire cable 210 and crimped to a second wire conductor 218 of the second wire cable 214. The splice terminals 202, 204 provide mechanical strength to the electrical splice connector 200 and inhibit the electrical splice connector 200 from being pulled apart. As shown in FIG. 4, the electrical splice connector 200 is covered by heat shrink tubing 402.

The first and second splice terminals 202, 204 are disposed within first and second cavities 220, 222 defined by the dividing insulator 206. The dividing insulator 206 is formed of a dielectric material, such as an engineered polymer. The first and second cavities 220, 222, and thereby the first and second splice connectors 202, 204 are separated by a wall 224 between the first and second cavities 220, 222. In order to control capacitive coupling between the first and second splice terminals 202, 204 and thereby control an electrical impedance of the electrical splice connector 200, the wall 224 may have one or more openings 226 between the first and second cavities 220, 222. Alternatively, or additionally, the dividing insulator 502 may have one or more sections 504 of reduced thickness in the wall 506 to control capacitive coupling between the first and second splice terminals as shown in FIG. 5. In other embodiments, the wall of the dividing insulator may be solid and of consistent thickness depending on the capacitive coupling requirements between the first and second splice terminals needed to obtain the desired inductance of the electrical splice connector.

The dividing insulator 206 maintains equal spacing between the first conductors 208, 216 and the second conductors 216, 218 of the first and second wire cables 210, 214 within the electrical splice connector 100 and is configured to closely match the average dielectric constant value found between the first conductors 208, 216 and the second conductors 216, 218 in the first and second wire cables 210, 214. This provides an electrical splice connector 200 with reduced signal attenuation and impedance values that closely match an unspliced cable. The maximum outer dimension of the dividing insulator 206 is less than or equal to the diameter of the first and second wire cables 210, 214, thereby providing easier packaging of the spliced cable in vehicular applications. Typically, the splicing methods described in the BACKGROUND provided a splice connection that had a diameter much larger than the cable diameter.

The first splice terminal 202 is identical to the second splice terminal 204. The first splice terminal 202 defines a first cable stop 228 contacting an end of the first wire conductor 208 of the first wire cable 210 and contacting an end of the first wire conductor 212 of the second wire cable 214. The second splice terminal 204 defines a second cable stop 230 contacting an end of the second wire conductor 216 of the first wire cable 210 and contacting an end of the second wire conductor 218 of the second wire cable 214. The cable stops 228, 230 may be formed by wings that are crimped prior to the insertion of the cables 210, 214 in wire crimping wings 232 of the splice terminals in order to provide the cable stops 228, 230.

The first cable stop 228 is aligned with the second cable stop 230 within the dividing insulator 206 by terminal stops 234 defined at the ends of the first and second cavities 220, 222 as shown in FIG. 2. These features further contribute to reduced signal attenuation and impedance values closely matching the original unspliced cable.

The length of the splice terminals and dividing insulator are preferably minimized to limit electromagnetic interference (EMI) that may be caused by the electrical splice connector 100.

The dividing insulator is disposed in the heat shrinkable tube 402. The heat shrink tubing 402 provides a barrier to environmental contaminants from contacting the first and second conductors 208, 212, 216, 218 of the first and second wire cables 210, 214 and the first and second splice terminals 202, 204 that may degrade mechanical and electrical performance of the electrical splice connector 200.

As shown in FIG. 2 the dividing insulator 206 of the illustrated embodiment includes a first opening 226 and a separate second opening 226 that are positioned equidistantly from a longitudinal center Y of the dividing insulator 206. In other embodiments, the dividing insulator may have a single opening or more than two openings depending upon the dielectric characteristics required to maintain the average dielectric constant value found between first and second conductors in the first and second wire cables. The first and second splice terminals 202, 204 are equidistant from a lateral center X of the dividing insulator 206.

A method 600 of splicing a first wire cable to a second wire cable shown in FIG. 6 includes:

STEP 602, joining a first wire conductor of a first wire cable to a first wire conductor of a second wire cable by crimping a first splice terminal to the first wire conductors;

STEP 604, joining a second wire conductor of the first wire cable to a second wire conductor of the second wire cable by crimping a second splice terminal to the second wire conductors;

STEP 606 placing the first splice terminal within a first cavity of a dividing insulator;

STEP 608, placing the second splice terminal within a second cavity of the dividing insulator which is separated from the first cavity by a wall;

STEP 610, forming at least one opening in the wall to control capacitive coupling between the first and second splice terminals;

STEP 612, placing a heat shrinkable tube over the dividing insulator; and.

STEP 614, heating the heat shrinkable tube, such that an inner surface of the heat shrinkable tube is in contact with the dividing insulator.

In some aspects, the techniques described herein relate to an electrical splice connector, including: a first splice terminal crimped to a first wire conductor of a first wire cable and crimped to a first wire conductor of a second wire cable, a second splice terminal crimped to a second wire conductor of the first wire cable and crimped to a second wire conductor of the second wire cable, and a dividing insulator formed of a dielectric material having a first cavity in which the first splice terminal is disposed and having a second cavity in which the second splice terminal is disposed, wherein the second cavity is separated from the first cavity by a wall formed of the dielectric material.

In some respects, the techniques described herein relate to an electrical splice connector, wherein at least one opening between the first cavity and the second cavity is formed in the wall to control capacitive coupling between the first and second splice terminal and thereby control an electrical impedance of the electrical splice connector.

In some respects, the techniques described herein relate to an electrical splice connector, wherein at least one section of the wall has a reduced thickness to control capacitive coupling between the first and second splice terminal and thereby control an electrical impedance of the electrical splice connector.

In some respects, the techniques described herein relate to an electrical splice connector, further including a heat shrinkable tube in which the dividing insulator is disposed.

In some respects, the techniques described herein relate to an electrical splice connector, wherein the first splice terminal is identical to the second splice terminal.

In some aspects, the techniques described herein relate to an electrical splice connector, wherein the first splice terminal defines first cable stop contacting an end of the first wire conductor of the first wire cable and contacting an end of the first wire conductor of the second wire cable and wherein the second splice terminal defines second cable stop contacting an end of the second wire conductor of the first wire cable and contacting an end of the second wire conductor of the second wire cable.

In some respects, the techniques described herein relate to an electrical splice connector, wherein the first cable stop is aligned with the second cable stop be terminal stops defined in the first and second cavities within the dividing insulator.

In some respects, the techniques described herein relate to an electrical splice connector, wherein the first and second cable stops are positioned at a longitudinal center of the dividing insulator.

In some respects, the techniques described herein relate to an electrical splice connector, wherein the first and second cable stops are integrally formed with the first and second splice terminals respectively.

In some respects, the techniques described herein relate to an electrical splice connector, wherein the at least one opening includes a first opening and a separate second opening positioned equidistantly from a longitudinal center of the dividing insulator.

In some respects, the techniques described herein relate to an electrical splice connector, wherein the first splice terminal and the second splice terminal are equidistant from a lateral center of the dividing insulator.

In some aspects, the techniques described herein relate to a method of splicing a first wire cable to a second wire cable, including: joining a first wire conductor of a first wire cable to a first wire conductor of a second wire cable by crimping a first splice terminal to the first wire conductors, joining a second wire conductor of the first wire cable to a second wire conductor of the second wire cable by crimping a second splice terminal to the second wire conductors, placing the first splice terminal within a first cavity of a dividing insulator, and placing the second splice terminal within a second cavity of the dividing insulator which is separated from the first cavity by a wall.

In some respects, the techniques described herein relate to a method, further including forming at least one opening in the wall to control capacitive coupling between the first and second splice terminals.

In some respects, the techniques described herein relate to a method, further including the steps of placing a heat shrinkable tube over the dividing insulator and heating the heat shrinkable tube such that an inner surface of the heat shrinkable tube is in contact with the dividing insulator.

In some aspects, the techniques described herein relate to a method, further including: folding a first pair of stop tabs of the first splice terminal inwardly to form a first cable stop, placing an end of the first wire conductor of the first wire cable in contact with the first cable stop and placing an end of the first wire conductor of the second wire cable in contact with the first cable stop prior to crimping the first splice terminal to the first wire conductors, folding a second pair of stop tabs of the second splice terminal inwardly to form a second cable stop, and placing an end of the second wire conductor of the first wire cable in contact with the second cable stop and placing an end of the second wire conductor of the second wire cable in contact with the second cable stop prior to crimping the second splice terminal to the second wire conductors.

In some respects, the techniques described herein relate to a method, further including aligning the first and second cable stops such that they are positioned at a longitudinal center of the dividing insulator.

In some respects, the techniques described herein relate to a method, further including aligning the first cable stop with the second cable stop within the dividing insulator.

In some respects, the techniques described herein relate to a method, wherein the first splice terminal is identical to the second splice terminal.

In some respects, the techniques described herein relate to a method, wherein the at least one opening includes a first opening and a separate second opening positioned equidistantly from a longitudinal center of the dividing insulator.

In some respects, the techniques described herein relate to a method, further including placing the first splice terminal and the second splice terminal within the dividing insulator such that they are equidistant from a lateral center of the dividing insulator.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. An electrical splice connector, comprising:
a first splice terminal crimped to a first wire conductor of a first wire cable and crimped to a first wire conductor of a second wire cable;
a second splice terminal crimped to a second wire conductor of the first wire cable and crimped to a second wire conductor of the second wire cable; and
a dividing insulator formed of a dielectric material having a first cavity in which the first splice terminal is disposed and having a second cavity in which the second splice terminal is disposed, wherein the second cavity is separated from the first cavity by a wall formed of the dielectric material, the wall having a reduced thickness between the first splice terminal and the second splice terminal, the reduced thickness configured to control capacitive coupling between the first and second splice terminals and thereby control an electrical impedance of the electrical splice connector.

2. The electrical splice connector according to claim 1, wherein the wall further defines at least one opening through the wall between the first splice terminal in the first cavity and the second splice terminal in the second cavity and wherein the at least one opening is configured to further control capacitive coupling between the first and second splice terminals.

3. The electrical splice connector according to claim 2, wherein the at least one opening comprises a first opening and a separate second opening positioned equidistantly from a longitudinal center of the dividing insulator.

4. The electrical splice connector according to claim 1, further comprising a heat shrinkable tube in which the dividing insulator is disposed.

5. The electrical splice connector according to claim 1, wherein the first splice terminal defines a first cable stop contacting an end of the first wire conductor of the first wire cable and contacting an end of the first wire conductor of the second wire cable and wherein the second splice terminal defines a second cable stop contacting an end of the second wire conductor of the first wire cable and contacting an end of the second wire conductor of the second wire cable.

6. The electrical splice connector according to claim 5, wherein the first cable stop is aligned with the second cable stop by terminal stops defined in the first and second cavities within the dividing insulator.

7. The electrical splice connector according to claim 6, wherein the first and second cable stops are positioned at a longitudinal center of the dividing insulator.

8. The electrical splice connector according to claim 5, wherein the first and second cable stops are integrally formed with the first and second splice terminals respectively.

9. The electrical splice connector according to claim 1, wherein the first splice terminal and the second splice terminal are equidistant from a lateral center of the dividing insulator.

10. A method of splicing a first wire cable to a second wire cable, comprising:

joining a first wire conductor of a first wire cable to a first wire conductor of a second wire cable by crimping a first splice terminal to the first wire conductors;
joining a second wire conductor of the first wire cable to a second wire conductor of the second wire cable by crimping a second splice terminal to the second wire conductors;
forming a dividing insulator having a first cavity and a second cavity divided by a wall formed of a dielectric material, the wall having a reduced thickness between the first splice terminal and the second splice terminal;
placing the first splice terminal within a first cavity of the dividing insulator; and
placing the second splice terminal within a second cavity of the dividing insulator such that the at least one section is between the first splice terminal and the second splice terminal.

11. The method according to claim 10, further comprising:
forming at least one opening through the wall between the first splice terminal and the second splice terminal.

12. The method according to claim 11, wherein the at least one opening comprises
a first opening and a separate second opening positioned equidistantly from a longitudinal center of the dividing insulator.

13. The method according to claim 10, further comprising:
placing a heat shrinkable tube over the dividing insulator; and
heating the heat shrinkable tube such that an inner surface of the heat shrinkable tube is in contact with the dividing insulator.

14. The method according to claim 10, further comprising:
folding a first pair of stop tabs of the first splice terminal inwardly to form a first cable stop;
placing an end of the first wire conductor of the first wire cable in contact with the first cable stop and placing an end of the first wire conductor of the second wire cable in contact with the first cable stop prior to crimping the first splice terminal to the first wire conductors;
folding a second pair of stop tabs of the second splice terminal inwardly to form a second cable stop; and
placing an end of the second wire conductor of the first wire cable in contact with the second cable stop and placing an end of the second wire conductor of the second wire cable in contact with the second cable stop prior to crimping the second splice terminal to the second wire conductors.

15. The method according to claim 14, further comprising aligning the first and second cable stops such that they are positioned at a longitudinal center of the dividing insulator.

16. The method according to claim 14, further comprising aligning the first cable stop with the second cable stop within the dividing insulator.

17. The method according to claim 10, wherein the first splice terminal is identical to the second splice terminal.

18. The method according to claim 10, further comprising placing the first splice terminal and the second splice terminal within the dividing insulator such that they are equidistant from a lateral center of the dividing insulator.

19. An electrical splice connector for connecting a first wire cable having first and second wire conductors and a second wire cable having first and second wire conductors, the electrical splice connector comprising:

a first splice terminal configured for being crimped to the first wire conductor of the first wire cable and for being crimped to the first wire conductor of the second wire cable;

a second splice terminal configured for being crimped to the second wire conductor of the first wire cable and for being crimped to the second wire conductor of the second wire cable; and a dividing insulator formed of a dielectric material having a first cavity in which the first splice terminal is disposed and having a second cavity in which the second splice terminal is disposed, wherein the second cavity is separated from the first cavity by a wall formed of the dielectric material, the wall defining an opening through the wall between the first splice terminal in the first cavity and the second splice terminal in the second cavity, the opening configured to control capacitive coupling between the first and second splice terminals and thereby control an electrical impedance of the electrical splice connector.

* * * * *